(12) United States Patent
King et al.

(10) Patent No.: US 9,217,473 B2
(45) Date of Patent: Dec. 22, 2015

(54) CYLINDER ASSEMBLY USING A SHIM

(71) Applicant: KING CYCLE GROUP, INC., Portland, OR (US)

(72) Inventors: Christopher Dale King, Portland, OR (US); Brian Keith Schultz, Portland, OR (US); Erik Steven Drews, Portland, OR (US)

(73) Assignee: King Cycle Group, Inc., Portland, OR (US)

( * ) Notice: Subject to any disclaimer, the term of this patent is extended or adjusted under 35 U.S.C. 154(b) by 0 days.

(21) Appl. No.: 14/211,011

(22) Filed: Mar. 14, 2014

(65) Prior Publication Data

US 2014/0334753 A1 Nov. 13, 2014

Related U.S. Application Data

(60) Provisional application No. 61/794,354, filed on Mar. 15, 2013.

(51) Int. Cl.
| | |
|---|---|
| *F16C 13/00* | (2006.01) |
| *F16C 43/04* | (2006.01) |
| *F16C 35/02* | (2006.01) |
| *B62K 19/34* | (2006.01) |
| *F16C 35/077* | (2006.01) |
| *F16C 17/02* | (2006.01) |
| *F16C 43/02* | (2006.01) |
| *F16C 19/54* | (2006.01) |

(52) U.S. Cl.
CPC ............... *F16C 35/02* (2013.01); *B62K 19/34* (2013.01); *F16C 17/02* (2013.01); *F16C 35/077* (2013.01); *F16C 43/02* (2013.01); *F16C 19/54* (2013.01); *F16C 2208/70* (2013.01); *F16C 2240/60* (2013.01); *F16C 2326/28* (2013.01); *Y10T 29/4927* (2015.01)

(58) Field of Classification Search
CPC ....... F16C 27/066; F16C 35/07; F16C 35/077
USPC .................. 384/535–537, 544, 545, 589, 626
See application file for complete search history.

(56) References Cited

U.S. PATENT DOCUMENTS

| | | |
|---|---|---|
| 1,423,950 A | 7/1922 | Leon |
| 1,738,037 A | 12/1929 | Collins |
| 1,978,527 A | 10/1934 | Erickson |
| 2,504,776 A | 4/1950 | Woodfield et al. |

(Continued)

FOREIGN PATENT DOCUMENTS

| | | |
|---|---|---|
| EP | 0049675 A1 | 4/1982 |
| WO | WO 2014150356 A1 | 9/2014 |

*Primary Examiner* — Phillip A Johnson
(74) *Attorney, Agent, or Firm* — Brinks Gilson & Lione

(57) ABSTRACT

A cylinder assembly includes a housing defining first and second outer cylindrical surfaces having a longitudinal axis and a shim having a retaining ring fitted over the first outer cylindrical surface. The shim includes a plurality of connector spokes extending from the retaining ring, and a corresponding plurality of shim elements configured at the ends of the plurality of connector spokes. The connector spokes extend radially from the retaining ring relative to the longitudinal axis when the shim is in a pre-installation configuration. The connector spokes are bendable such that the shim elements extend longitudinally and are positioned next to the second outer cylindrical surface when the shim is in an installation configuration. Shims, methods of assembly, bicycles and other components are also provided.

26 Claims, 4 Drawing Sheets

(56) References Cited

U.S. PATENT DOCUMENTS

| | | | |
|---|---|---|---|
| 2,506,404 A | 5/1950 | Woodfield et al. | |
| 2,534,142 A | 12/1950 | Morton et al. | |
| 2,700,581 A | 1/1955 | Migny | |
| 2,886,354 A | 5/1959 | Björklund | |
| 3,061,386 A | 10/1962 | Dix et al. | |
| 3,097,895 A | 7/1963 | Matt | |
| 3,365,256 A | 1/1968 | Dardani et al. | |
| 3,467,451 A | 9/1969 | Marley | |
| 3,709,570 A | 1/1973 | Galbato | |
| 4,240,677 A | 12/1980 | Payne et al. | |
| 4,353,603 A | 10/1982 | Ström et al. | |
| 4,376,254 A | 3/1983 | Hellmann | |
| 4,458,858 A | 7/1984 | Nelson | |
| 4,545,691 A | 10/1985 | Kastan et al. | |
| 4,611,933 A | 9/1986 | Hofmann et al. | |
| 4,772,139 A | 9/1988 | Bretton | |
| 4,883,154 A * | 11/1989 | Drewes et al. | 192/98 |
| 5,061,089 A | 10/1991 | Bair et al. | |
| 5,433,534 A | 7/1995 | Chen | |
| 5,572,909 A | 11/1996 | Chi | |
| 5,632,561 A | 5/1997 | Chi | |
| 6,318,900 B1 * | 11/2001 | Bere et al. | 384/535 |
| 6,579,012 B2 | 6/2003 | Brandenstein et al. | |
| 7,103,974 B2 | 9/2006 | Brandenstein et al. | |
| 7,478,952 B2 | 1/2009 | Faust et al. | |
| 7,580,225 B2 | 8/2009 | Hanrahan et al. | |
| 7,610,671 B2 | 11/2009 | Watkins et al. | |
| 8,128,112 B2 | 3/2012 | Moeching | |
| 2002/0118490 A1 | 8/2002 | Macpherson et al. | |

\* cited by examiner

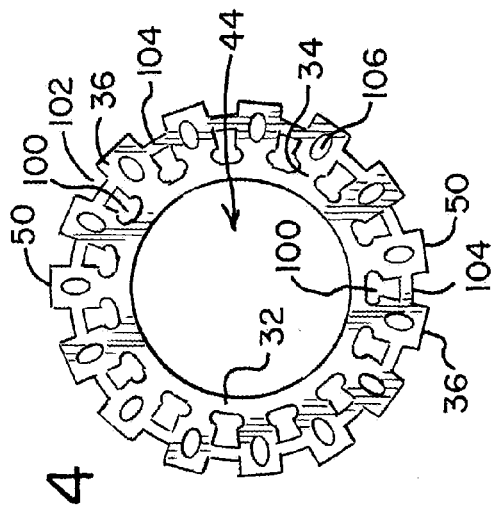
FIG. 3
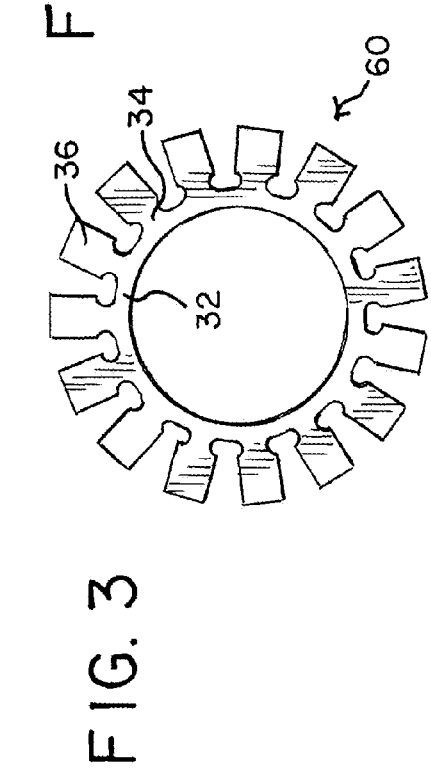
FIG. 4
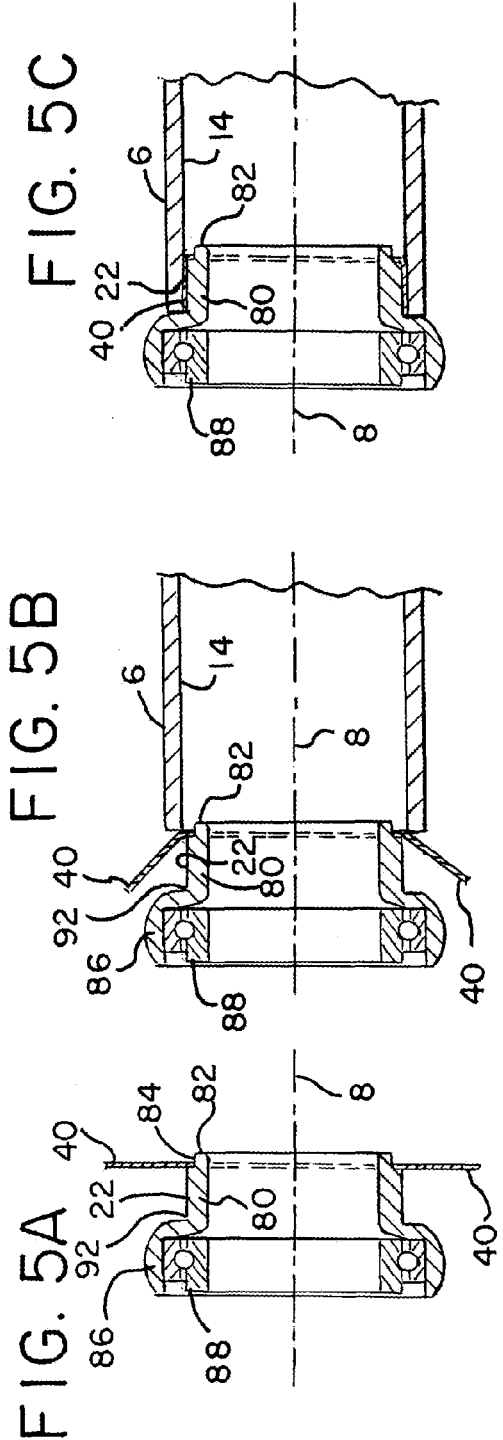
FIG. 5A
FIG. 5B
FIG. 5C

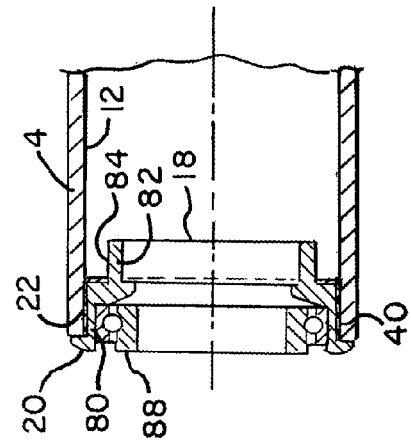
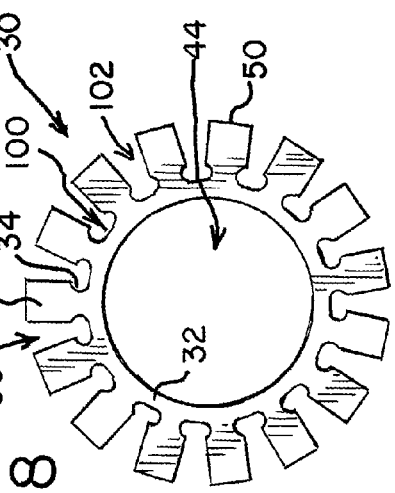
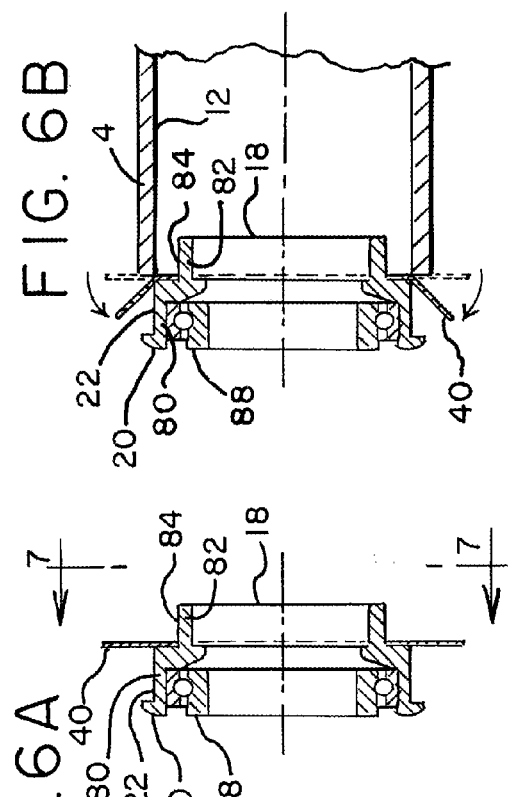
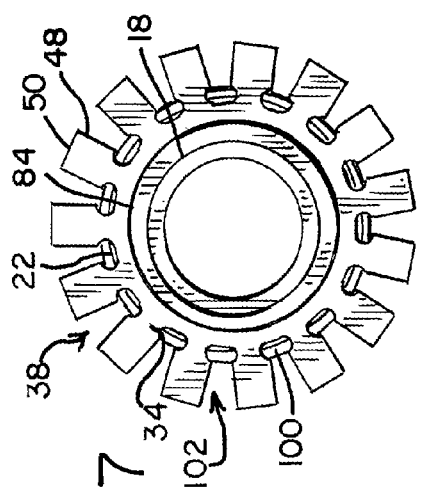

CYLINDER ASSEMBLY USING A SHIM

This application claims the benefit of U.S. Provisional Application No. 61/794,354, filed Mar. 15, 2013, the entire disclosure of which is hereby incorporated herein by reference.

FIELD OF THE INVENTION

The present invention relates generally to a cylinder assembly using a shim, and in particular to a cylindrical bearing assembly using a shim, and to methods of installing such assemblies.

BACKGROUND

Bicycles are commonly configured with a bottom bracket bearing assembly. The bottom bracket is attached to a bicycle frame and contains bearings through which the crank spindle passes. This allows the crankset to rotate in relation to the bicycle frame and transmit force input from the rider's legs through the chain, belt, or shaft to the rear wheel. In one configuration, the bearings are pressed into cups, with the cup then being pressed into a bottom bracket shell. To secure (or retain) the cup this type of installation relies on a certain amount of interference between the bottom bracket shell and the outer diameter of the cup. If there is too much interference, the bearing may not rotate easily and may wear prematurely. If there is too little interference, the cup may move in the frame, resulting in creaking and/or damage to the frame, cup, or bearing.

While precise specifications exist for the sizing of the holes into which the cups are pressed, the actual size may vary among different bicycle frames. As a result, it may be difficult to achieve a proper interference fit with a single size of cup. This deficiency in the installation of cup (interference cylindrical fit) may apply to other bicycle components, as well as other devices utilizing two interfacing cylinders installed with an interference fit.

SUMMARY

The present invention is defined by the following claims, and nothing in this section should be considered to be a limitation on those claims.

In one aspect, one embodiment of a cylinder assembly includes a housing defining first and second outer cylindrical surfaces having a longitudinal axis and a shim having a retaining ring fitted over the first outer cylindrical surface. The shim includes a plurality of connector spokes extending from the retaining ring, and a corresponding plurality of shim elements configured at the ends of the plurality of connector spokes. The connector spokes extend radially from the retaining ring relative to the longitudinal axis when the shim is in a pre-installation configuration. The connector spokes are bendable such that the shim elements extend longitudinally and are positioned next to the second outer cylindrical surface when the shim is in an installation configuration.

In one embodiment, the cylinder is formed on a bicycle, for example as a bottom bracket shell or head tube In another aspect, one embodiment of a method of installing a cylinder assembly includes providing a housing defining an outer cylindrical surface having a longitudinal axis, installing the retaining ring of the shim over the first outer cylindrical surface, and bending the plurality of connector spokes.

The various embodiments provide significant advantages. For example and without limitation, various shims may be used to accommodate variations in cylindrical interfaces. The shims may be made easily and inexpensively with a high degree of reliability in the thickness determination. The shims can further reduce the possibility of corrosion, and other potential damage associated with ill-fitted cylindrical assemblies, such as bearing assemblies.

The foregoing paragraphs have been provided by way of general introduction, and are not intended to limit the scope of the following claims. The various preferred embodiments, together with further advantages, will be best understood by reference to the following detailed description taken in conjunction with the accompanying drawings.

BRIEF DESCRIPTION OF THE DRAWINGS

FIG. 3 is a plan view of a piece of shim stock before a shim is stamped therefrom.

FIG. 4 is an alternative embodiment of a shim.

FIGS. 5A-C are cross-sectional views showing the installation of a shim in one embodiment.

FIGS. 6A-C are cross-sectional view showing the installation of a shim in another embodiment.

FIG. 7 is an end view of the assembly taken along line 7-7 of FIG. 6A.

FIG. 8 is a plan view of one embodiment of a shim.

DETAILED DESCRIPTION OF THE PRESENTLY PREFERRED EMBODIMENTS

It should be understood that the term "plurality," as used herein, means two or more. The term "longitudinal," as used herein means of or relating to length or the lengthwise direction, for example of bearing cup, bottom bracket, or assembly thereof. The term "radial," as used herein, means directed toward or away from an axis, for example away from longitudinal axis, or toward or away from a surface of a component. The term "coupled" means connected to or engaged with, whether directly or indirectly, for example with an intervening member, and does not require the engagement to be fixed or permanent, although it may be fixed or permanent. The term "transverse" means extending across an axis, and/or substantially perpendicular to an axis. It should be understood that the use of numerical terms "first," "second," "third," etc., as used herein does not refer to any particular sequence or order of components; for example "first" and "second" shims may refer to any sequence of such segments, and is not limited to the first and second shims of a particular configuration unless otherwise specified.

Figure 1:
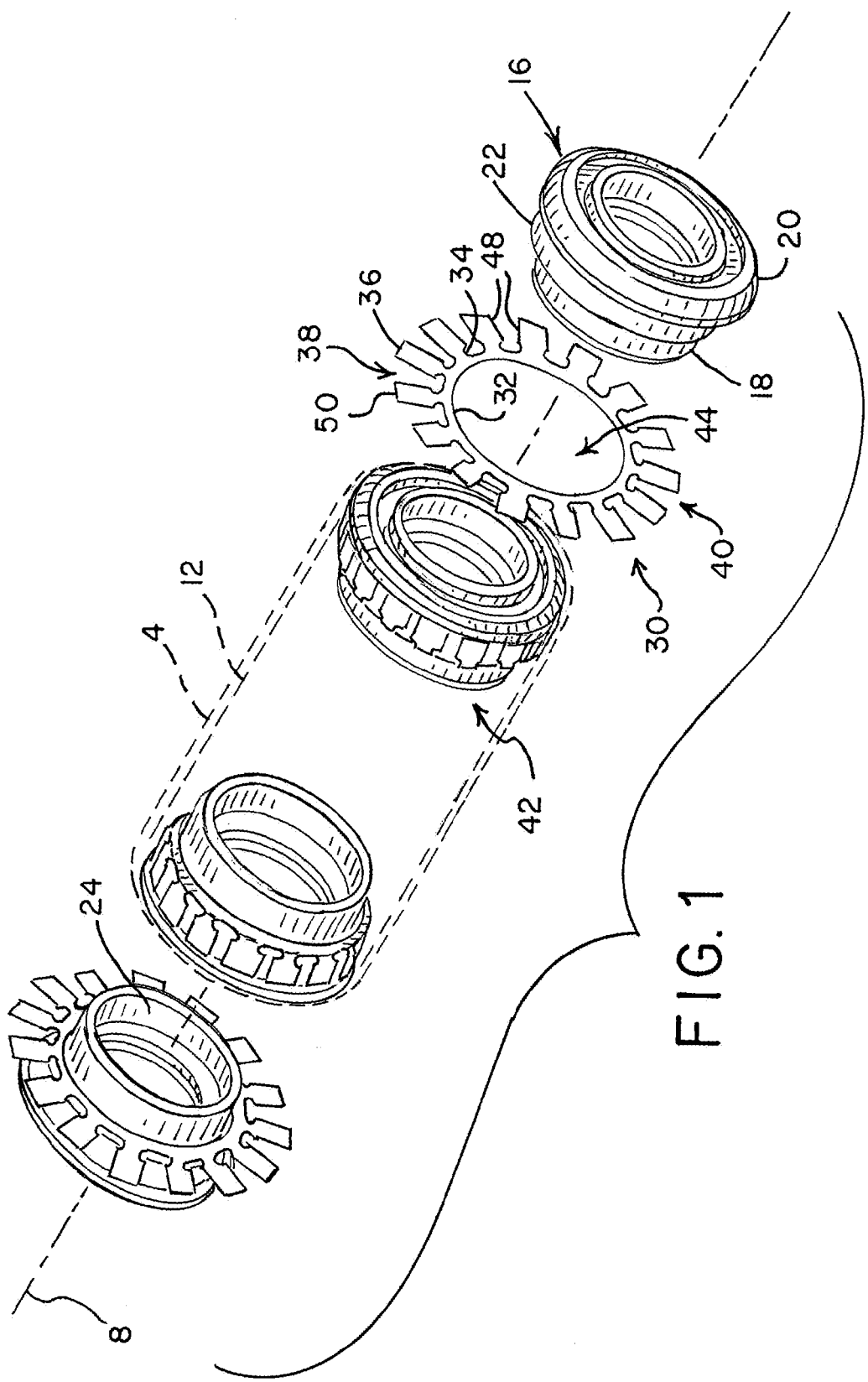
FIG. 1 is an exploded view of a bearing assembly.
Figure 2:
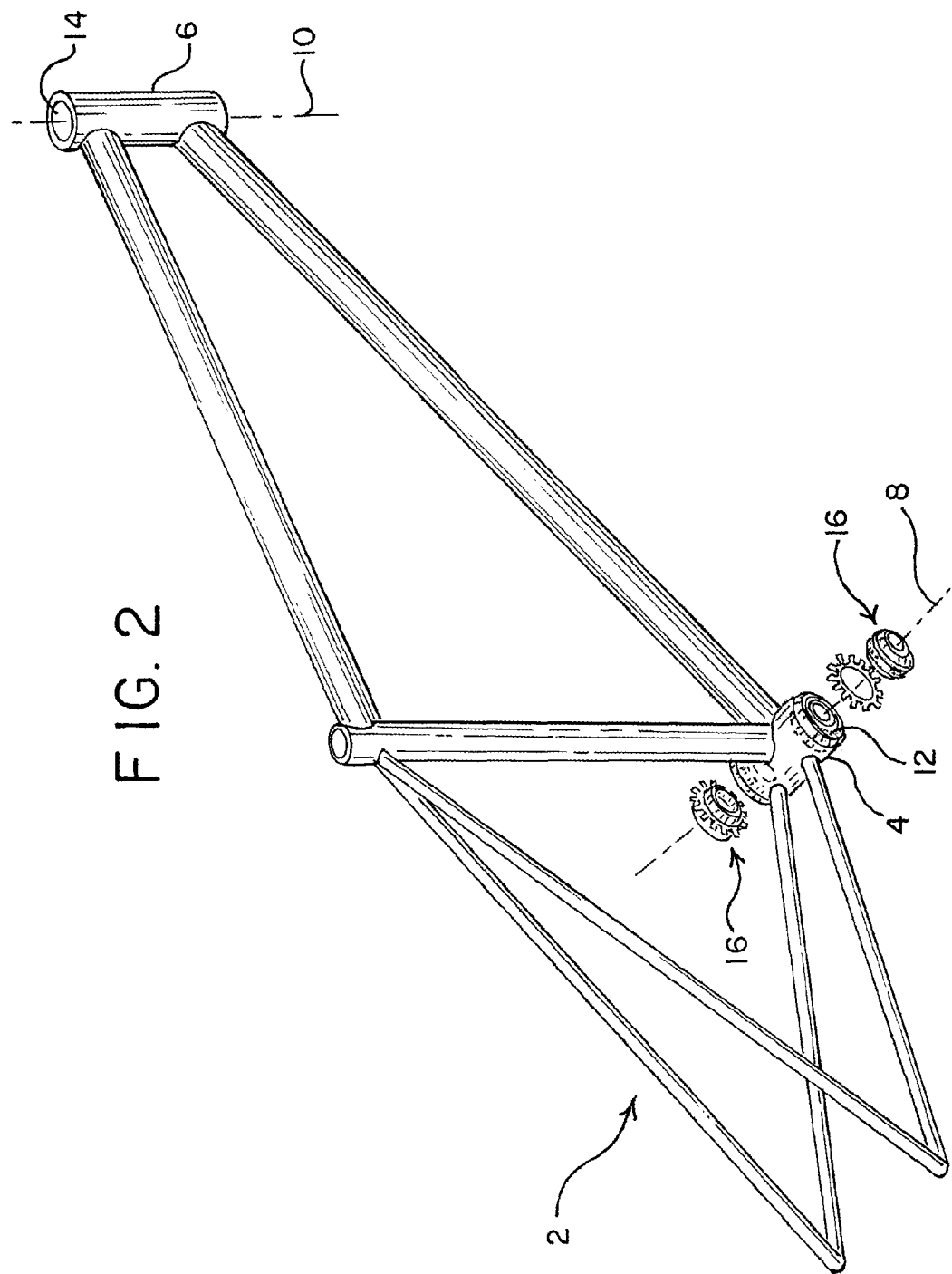
FIG. 2 is an exploded view of a bicycle frame and bearing assembly.

Referring to FIG. 2, a bicycle frame 2 is shown as having a bottom bracket shell 4, configured as a tube, and a head tube 6, each defining a longitudinal axis 8, 10. Each of the bottom bracket shell and head tube has an inner surface 12, 14 defining a longitudinal cavity, with the inner surface shaped as a cylinder in one embodiment. Referring to FIGS. 1 and 2, a mating bearing assembly 16 includes a cup 18 having an outer cylindrical surface 22 shaped to mate with the inner surface 12 as the cup is inserted into the cavity along the longitudinal axis 8. In one embodiment, a pair of longitudinally spaced cups 18 is inserted into opposite ends of the shell 4 or tube 6. Each cup includes a housing having a first portion 80 defining an outer surface 22, and a second portion 82 extending longitudinally from the first portion and defining an outer surface 84, wherein the outer surface 84 has a smaller diameter than the outer surface 22. Both portions 80, 82 are cylindrical in one embodiment. As shown in FIGS. 5A-C, the cup may include a third portion 86. A bearing 88 is disposed in the first portion 80 (see FIGS. 6A-C), or in the third portion 86 (see FIGS. 5A-C). The housing may include an annular flange 20 extending radially therefrom at one end of the housing (FIG. 6C). The flange 20 abuts the end of the shell 4 or tube 6 and helps locate the cup relative to the shell or tube, with the bearing 88 located interiorly to the shell or tube. Alternatively, the third portion 86 defines a shoulder 92 (FIG. 5C) that abuts the end of the shell or tube, with the bearing 88 being located externally to the shell or tube in this embodiment.

Referring to FIGS. 1, 2, 7 and 8, a shim 30 includes a retaining ring 32 having a central opening 44 surrounding the axis 8 and sized to fit over the outer surface 84 of the second portion 82 of the housing. A plurality of connecting spokes 34 are circumferentially spaced and extend radially from the retaining ring 32. Shim elements 36 are supported at the ends of the connecting spokes 34. The shim elements 36 are circumferentially enlarged relative to the spokes 34. In one embodiment, adjacent shim elements have side edges 48 that are circumferentially spaced when the shim is in a pre-installation flat configuration 40. Spaces 38 between the spokes and shim elements have a key-hole shape in one embodiment, with a larger opening portion 100, or relief, formed between the spokes 34 than the opening portion 102, or slot, between the shim elements 36 so as to maximize the surface area of the shim elements while minimize the bending force required to bend the spokes. In one embodiment, the sides 48 of the shim element defining the slot 102 are non-parallel when the shim is in the pre-installation configuration and are parallel when the shim is in the installation configuration. In addition, the narrow spoke better allows for deformation as the shim material transitions from a pre-installation flat form to an installation configuration wherein the shim elements conform to a cylindrical shape. In one embodiment, shown in FIG. 4, the side edges 48 of the adjacent shim elements may be connected with a bridge element 104. In either embodiment, openings 106 may be formed in the shim element 36. Referring to FIGS. 1 and 2, end edges 50 of the shim elements may be linear, but in combination define a generally circular shape.

In one embodiment, the shim 40 is made of a resilient material, such as a "Mylar" polyester film. If should be understood that the shims may also be made of other materials, including polymeric films and thin metallic sheets. Different shims 40, and including the shim elements and spokes in particular, may be configured in varying thicknesses ranging from 0.002 to 0.009 inches, with each shim having a uniform thickness. In this way, different thickness shims may be selected for a particular interface, including for example the need to accommodate varying hole sizes in the frames 2. Referring to FIG. 4, the shims may be manufactured quickly and reliably by stamping the final shape from a flat piece of shim stock 60, made of a resilient material with a controlled thickness.

In operation, and referring to FIGS. 5A-C and 6A-C, the retaining ring 32 is positioned over the outer surface 84 of the second portion of the housing 82 before the cup is pressed into the shell 4 or tube 6, with the connector spokes 34 and shim elements 36 extending radially from the retaining ring relative to the longitudinal axis 8 in a pre-installation configuration (FIGS. 5A, 6A and 7). The connecting spokes 34 are then bent, for example by contacting the shell or tube (FIGS. 5B and 6B), until the shim elements 36 extend in the longitudinal direction 8 along the outer surface 22 of the housing in an installation configuration. When the shim elements 36 are positioned in the installation configuration, the spacing between adjacent shim elements 36 is reduced. In one embodiment, the side edges 48 of the shim elements may abut when positioned in the installation configuration. The cup is then pressed into the interior cavity of the shell 4 or tube 6, as shown in FIGS. 1, 2, 5C and 6C. During the pressing operation, the shim 40 conforms to the shape of the cup at the interference with the frame and becomes an integral part of the press fit. At the same time, the shims 40, and the shim elements 36 in particular, isolate the cup material from the frame material at the press location, reducing the possibility of corrosion and/or creaking. The pressing process draws the shim with the cup, maintaining the shim in tension.

It should be understood that the shims may also work with other cylindrical interfaces, including various interfaces of bearings, tubes, pipes, rods, and/or combinations thereof, and may include such interfaces used in other devices besides bicycles, including various vehicular devices such as autos, aircraft, motorcycles, ships/boats, appliance, plumbing accessories, machinery, construction equipment and materials, etc.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A cylinder assembly comprising:
   a housing defining first and second outer cylindrical surfaces having a longitudinal axis;
   a shim comprising a retaining ring fitted over said first outer cylindrical surface, a plurality of connector spokes extending from said retaining ring, and a corresponding plurality of shim elements configured at the ends of said plurality of connector spokes, wherein said connector spokes extend radially from said retaining ring relative to said longitudinal axis when said shim is in a pre-installation configuration, and wherein said connector spokes are bendable such that said shim elements extend longitudinally and are positioned next to said second outer cylindrical surface when said shim is in an installation configuration.

2. The cylinder assembly of claim 1 wherein said housing defines a bearing cup.

3. The cylinder assembly of claim 2 further comprising a bearing disposed in said bearing cup.

4. The cylinder assembly of claim 1 wherein said shim elements are circumferentially spaced when the shim is in the pre-installation configuration.

5. The cylinder assembly of claim 4 further comprising a bridge element connecting said circumferentially spaced shim elements.

6. The cylinder assembly of claim 1 wherein said shim elements have a thickness between about 0.002 and about 0.009 inches.

7. The cylinder assembly of claim 1 wherein said shim is made of a polyester film.

8. A bicycle comprising:
   a tube defining an inner cylindrical surface having a longitudinal axis;
   a bearing assembly comprising a housing defining first and second outer cylindrical surfaces having said longitudinal axis;
   a shim comprising a retaining ring fitted over said first outer cylindrical surface, a plurality of connector spokes extending from said retaining ring, and a corresponding plurality of shim elements configured at the ends of said plurality of connector spokes, wherein said connector spokes extend radially from said retaining ring relative to said longitudinal axis when said shim is in a pre-installation configuration, and wherein said connector spokes are bendable such that said shim elements extend longitudinally and are positioned between said inner and second outer cylindrical surfaces when said shim is in an installation configuration.

9. The bicycle of claim 8 wherein said tube comprises a bottom bracket shell.

10. The bicycle of claim 8 wherein said tube comprises a head tube.

11. The bicycle of claim 8 wherein said shim elements are circumferentially spaced when the shim is in the pre-installed configuration.

12. The bicycle of claim 11 further comprising a bridge element connecting said circumferentially spaced shim elements.

13. The bicycle of claim 8 wherein said shim elements have a thickness between about 0.002 and about 0.009 inches.

14. The bicycle of claim 8 wherein said shim is made of a polyester film.

15. A shim comprising:
   a retaining ring having a central opening defining a longitudinal axis;
   a plurality of connector spokes extending from said retaining ring; and
   a corresponding plurality of shim elements configured at the ends of said plurality of connector spokes, wherein said connector spokes extend radially from said retaining ring relative to said longitudinal axis when said shim is in a pre-installation configuration, and wherein said connector spokes are bendable such that said shim elements extend longitudinally when said shim is in an installation configuration, and wherein said shim elements conform to a cylindrical shape with each of said shim elements having a curvature defined about said longitudinal axis when said shim is in said installation configuration.

16. The shim of claim 15 wherein said shim elements are circumferentially spaced when the shim is in the pre-installed configuration.

17. A shim comprising: a retaining ring having a central opening defining a longitudinal axis; a plurality of connector spokes extending from said retaining ring; a corresponding plurality of shim elements configured at the ends of said plurality of connector spokes, wherein said connector spokes extend radially from said retaining ring relative to said longitudinal axis when said shim is in a pre-installation configuration, and wherein said connector spokes are bendable such that said shim elements extend longitudinally when said shim is in an installation configuration; and a bridge element connecting said circumferentially spaced shim elements.

18. The shim of claim 15 wherein said shim elements have a thickness between about 0.002 and about 0.009 inches.

19. The shim of claim 15 wherein said shim is made of a polyester film.

20. A method of installing a cylinder assembly comprising:
   providing a housing defining first and second outer cylindrical surfaces having a longitudinal axis;
   installing a retaining ring of a shim over said first outer cylindrical surface, wherein said shim comprises a plurality of connector spokes extending from said retaining ring, and a corresponding plurality of shim elements configured at the ends of said plurality of connector spokes, wherein said connector spokes extend radially from said retaining ring relative to said longitudinal axis when said shim is in a pre-installation configuration; and
   bending said plurality of connector spokes such that said shim elements extend longitudinally and elements are positioned next to said second outer cylindrical surface when said shim is in an installation configuration.

21. The method of claim 20 further comprising pressing said housing into a cylindrical cavity having an inner surface, wherein said shim is disposed between said inner and outer cylindrical surfaces.

22. The method of claim 20 wherein said housing comprises a bearing assembly.

23. The method of claim 20 wherein said shim elements are circumferentially spaced when the shim is in the pre-installed configuration.

24. The method of claim 23 further comprising a bridge element connecting said circumferentially spaced shim elements.

25. The method of claim 20 wherein said shim elements have a thickness between about 0.002 and about 0.009 inches.

26. The method of claim 20 wherein said shim is made of a polyester film.

* * * * *